US009753555B2

(12) United States Patent
Lee et al.

(10) Patent No.: US 9,753,555 B2
(45) Date of Patent: Sep. 5, 2017

(54) PEN TYPE MULTIMEDIA DEVICE FOR PROCESSING IMAGE DATA BY USING HANDWRITING INPUT AND METHOD FOR CONTROLLING THE SAME

(71) Applicant: LG ELECTRONICS INC., Seoul (KR)

(72) Inventors: Doyoung Lee, Seoul (KR); Juhwan Lee, Seoul (KR); Sinae Chun, Seoul (KR); Sihwa Park, Seoul (KR); Jongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 14/638,797

(22) Filed: Mar. 4, 2015

(65) Prior Publication Data

US 2016/0188011 A1   Jun. 30, 2016

(30) Foreign Application Priority Data

Dec. 30, 2014   (KR) .......................... 10-2014-0193084

(51) Int. Cl.
*G06F 3/033* (2013.01)
*G06F 3/0354* (2013.01)
(Continued)

(52) U.S. Cl.
CPC .......... *G06F 3/03545* (2013.01); *G06F 3/017* (2013.01); *G06F 3/033* (2013.01);
(Continued)

(58) Field of Classification Search
None
See application file for complete search history.

(56) References Cited

U.S. PATENT DOCUMENTS

| | | | |
|---|---|---|---|
| 7,970,763 B2 * | 6/2011 | Russo | G06F 17/30525 707/706 |
| 2005/0024346 A1 * | 2/2005 | Dupraz | G06F 3/03545 345/179 |

(Continued)

FOREIGN PATENT DOCUMENTS

| | | | | |
|---|---|---|---|---|
| EP | 2 703 985 A1 | 3/2014 | | |
| WO | WO 2013084087 A1 * | 6/2013 | | G06F 1/1643 |

OTHER PUBLICATIONS

Livescribe, "Introducing the new Livescribe 3 smartpen (US)," Oct. 24, 2013, https://www.youtube.com/watch?v=TFE74S40Wol.*

(Continued)

*Primary Examiner* — Nicholas R Wilson
(74) *Attorney, Agent, or Firm* — Birch, Stewart, Kolasch & Birch, LLP

(57) ABSTRACT

A pen type multimedia device includes a body unit having a pen form, at least one or more camera units that records a surrounding area of the body unit, a handwriting sensor unit that senses a handwriting input of a user and outputs an input signal and a handwriting signal, and a controller that processes the image data recorded by the camera unit and the user's input signal and handwriting signal. When the handwriting is a text and is sensed within a set period after acquiring an image, the controller adds the text to the image, and when the handwriting is a geometric shape and a text, and is sensed within a set period after acquiring an image, a tag is added to the image.

12 Claims, 8 Drawing Sheets

(51) Int. Cl.
*G06F 3/03* (2006.01)
*G09G 5/18* (2006.01)
*G06K 9/22* (2006.01)
*G06F 3/01* (2006.01)
*G06F 3/0488* (2013.01)

(52) U.S. Cl.
CPC ........ *G06F 3/0304* (2013.01); *G06F 3/04883* (2013.01); *G06K 9/222* (2013.01); *G09G 5/18* (2013.01); *G09G 2380/02* (2013.01)

(56) References Cited

U.S. PATENT DOCUMENTS

| | | |
|---|---|---|
| 2007/0005849 A1 | 1/2007 | Oliver |
| 2011/0164000 A1 | 7/2011 | Pance |
| 2012/0019488 A1* | 1/2012 | McCarthy ........... G06F 3/03545 345/179 |
| 2014/0015782 A1* | 1/2014 | Kim .................... G06F 3/04883 345/173 |
| 2014/0055426 A1* | 2/2014 | Park ........................ G06F 3/017 345/179 |

OTHER PUBLICATIONS

Jon Skeet, "Create whole path automatically when writing to a new file," https://web.archive.org/web/20130328130037/http://stackoverflow.com/questions/2833853/create-whole-path-automatically-when-writing-to-a-new-file, Mar. 28, 2013.*
Sebastiano, "Photoshop for Beginners: The Power of Layers," Jun. 22, 2010. http://wegraphics.net/blog/tutorials/photoshop/photoshop-for-beginners-the-powers-of-layers/.*

* cited by examiner

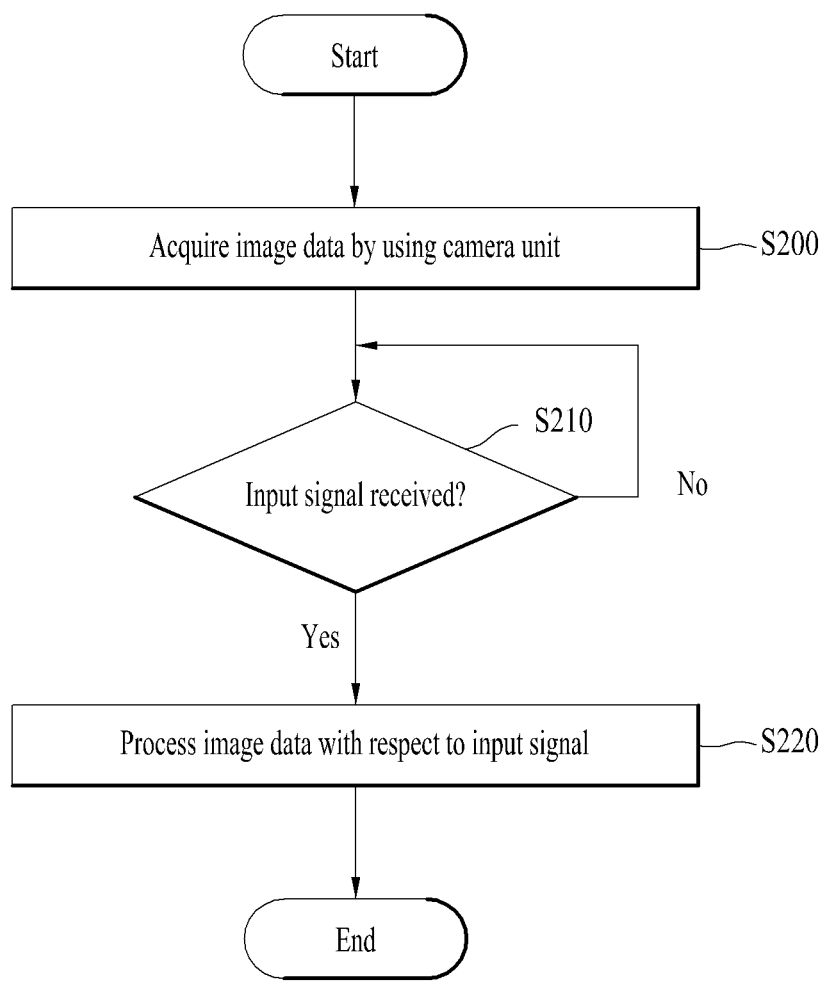

PEN TYPE MULTIMEDIA DEVICE FOR PROCESSING IMAGE DATA BY USING HANDWRITING INPUT AND METHOD FOR CONTROLLING THE SAME

Pursuant to 35 U.S.C. §119(a), this application claims the benefit of the Korean Patent Application No. 10-2014-0193084, filed on Dec. 30, 2014, which is hereby incorporated by reference as if fully set forth herein.

BACKGROUND OF THE INVENTION

Field of the Invention

This specification relates to a pen type multimedia device for processing image data by using handwriting input and a method for controlling the same and, more particularly, to a pen type multimedia device for processing image data by using handwriting input and a method for controlling the same that can process image data acquired through a camera by using a handwriting input.

Discussion of the Related Art

With the recent evolution in the electronic technology, diverse types of multimedia devices have been under development. Most particularly, research and development on pen type multimedia devices with a handwriting input function while enhancing device portability have been carried out for users who are more accustomed to recording information by using the conventional pen.

The pen type multimedia device may include diverse functions, and, as one of its diverse technologies (or functions), the pen type multimedia device may perform photo recording (or video recording or filming) through a camera equipped therein. At this point, according to the intentions of the user, the image data acquired through the camera may be required to be processed. In order to do so, an interface between the multimedia device and the user is required, and the development of a technology using the characteristics of the pen type multimedia device is also required.

SUMMARY OF THE INVENTION

Accordingly, the present specification is directed to a pen type multimedia device for processing image data by using handwriting input and a method for controlling the same that substantially obviate one or more problems due to limitations and disadvantages of the related art.

An object of this specification is to provide a pen type multimedia device and a method for controlling the same that can process image data acquired through a camera by using handwriting input.

Additional advantages, objects, and features of this specification will be set forth in part in the description which follows and in part will become apparent to those having ordinary skill in the art upon examination of the following or may be learned from practice of this specification. The objectives and other advantages of this specification may be realized and attained by the structure particularly pointed out in the written description and claims hereof as well as the appended drawings.

To achieve these objects and other advantages and in accordance with the purpose of this specification, as embodied and broadly described herein, a pen type multimedia device according to this specification may correspond to a pen type multimedia device including a body unit configured to have a pen form, at least one or more camera units each configured to record a surrounding area of the body unit, a handwriting sensor unit configured to sense a handwriting input of a user and to output an input signal and a handwriting signal, and a controller configured to process the image data recorded by the camera unit and the user's input signal and handwriting signal inputted through the handwriting sensor unit, wherein the controller may be configured to first acquire image data by using the camera unit, and, when an input signal of the user is received through the handwriting sensor unit within a predetermined period of input time, to process the image data in accordance with control operations respective to the input signal and handwriting signal.

According to an exemplary embodiment of this specification, when the input signal corresponds to a text input, the controller may convert the handwriting input being received through the handwriting sensor unit to a text, and then the controller may add the converted text to the image data.

In this case, when the image data are displayed on a screen, and when the converted text may be added to the image data so as to be displayed as overlaying on the displayed image, the controller may also add the converted text to a back side of the displayed image.

According to another exemplary embodiment of this specification, when the input signal corresponds to a tag input, the controller may convert the handwriting input being received through the handwriting sensor unit to a text, and then the controller may add a tag respective to the converted text to the image data.

According to yet another exemplary embodiment of this specification, when the input signal corresponds to a storage folder selection input, the controller may convert the handwriting input being received through the handwriting sensor unit to a text, and then the controller may store the image data to a folder respective to the converted text. In this case, when a folder respective to the converted text does not exist, the controller may first create a folder having a name of the converted text, and then the controller may store the image data in the newly created folder.

According to a further exemplary embodiment of this specification, when the input signal corresponds to a data transmission input, the controller may convert the handwriting input being received through the handwriting sensor unit to a text, and then the controller may transmit the image data to a destination respective to the converted text. In this case, the data transmission may be performed by using at least any one of a group consisting of SMS, e-mail, and SNS.

According to an exemplary embodiment of this specification, the handwriting sensor unit may correspond to an acceleration unit, and the controller may first convert a pattern being received through the handwriting sensor unit to a text, and then the controller may process the image data in accordance with control operations respective to the converted text.

According to another exemplary embodiment of this specification, the pen type multimedia device may further include a handwriting unit configured to be positioned on one end of the body part, and the handwriting unit may correspond to an image recognition unit configured to recognize characters written by the handwriting unit, and the controller may convert the characters being recognized by the handwriting sensor unit to a text via optical character recognition (OCR), and then the controller may process the image data in accordance with control operations respective to the converted text.

The pen type multimedia device according to this specification may further include a display unit configured to have its screen controlled by the controller. And, in this case, the image data recorded by the camera unit may be displayed on the display unit. Additionally, the display unit corresponds to a rollable display. And, at this point, the body part may be configured to have a groove formed on one side of the body part, a size of the groove corresponding to a size of the rollable display, and the rollable display may be unrolled outside of the body unit through the groove after being rolled inside the body part.

In order to achieve the above-described technical object of this specification, as a method for controlling a pen type multimedia device, which includes at least one or more camera units each configured to record a surrounding area, a handwriting sensor unit configured to sense a handwriting input of a user and to output an input signal and a handwriting signal, and a controller configured to process the image data recorded by the camera unit and the user's input signal and handwriting signal inputted through the handwriting sensor unit, the method may include the steps of (a) having the controller acquire image data by using the camera unit, and (b) after having the controller acquire the image data, when an input signal of the user is received through the handwriting sensor unit within a predetermined period of input time, having the controller process the image data in accordance with control operations respective to the input signal.

It is to be understood that both the foregoing general description and the following detailed description of this specification are exemplary and explanatory and are intended to provide further explanation of this specification as claimed.

BRIEF DESCRIPTION OF THE DRAWINGS

The accompanying drawings, which are included to provide a further understanding of this specification and are incorporated in and constitute a part of this application, illustrate embodiment(s) of this specification and together with the description serve to explain the principle of this specification. In the drawings:

FIG. 11 illustrates a flow chart of a method for controlling a pen type multimedia device according to an exemplary embodiment of this specification.

DETAILED DESCRIPTION OF THE INVENTION

Hereinafter, exemplary embodiments disclosed in this specification will be described in detail with reference to the accompanying drawings. At this point, the structure or configuration and operations of the exemplary embodiments disclosed in this specification will be provided in accordance with at least one exemplary embodiment of this specification. And, it will be apparent that the technical scope and spirit of this specification and the essential structure and operations of this specification will not be limited only to the exemplary embodiments set forth herein.

Figure 1:
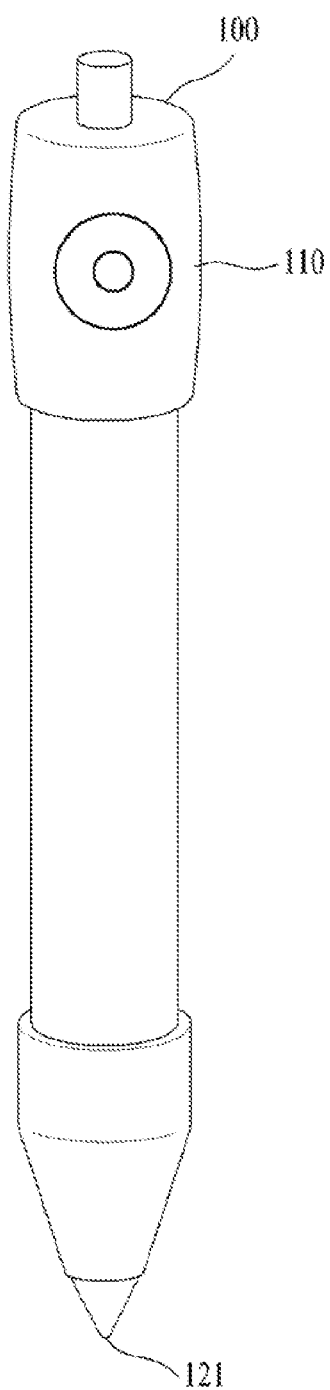
FIG. 1 illustrates an exemplary pen type multimedia device according to an exemplary embodiment of this specification.

FIG. 1 illustrates an exemplary pen type multimedia device according to an exemplary embodiment of this specification.

Referring to FIG. 1, the pen type multimedia device 10 may include a body unit 100, and a camera unit 110.

The body unit 100 has the form of a pen. The pen form may have diverse lengths, thicknesses, external features, and the pen form may also have diverse curvatures based upon ergonomics.

The camera unit 110 may capture (or record) a surrounding area of the body unit 100. In FIG. 1, although it is shown that the camera unit 110 is configured of only one camera unit for simplicity, depending upon the exemplary embodiment, the camera unit 110 may be configured of a plurality of camera units. More specifically, depending upon the number of camera units, a plurality of camera units 110 may be included in the pen type multimedia device. For example, in case the pen type multimedia device includes a plurality of camera units 110 consisting of multiple camera units, each of the camera units 110 may be positioned to face into different directions so as to be capable of recording the surrounding area of the body unit 100 in a panoramic format. The camera unit 110 may capture (or record) an image of the surrounding environment of the device 10 and may convert the captured (or recorded) image to an electrical signal. In order to do so, the camera unit 110 may include an image sensor that is configured to convert optical signals to electrical signals. The image, which is captured (or recorded) by the camera unit 110, and which is then converted to an electrical signal, may be stored in the storage unit 170, which will be described later on, and then outputted to the controller 130, which will also be described later on, or may be immediately outputted to the controller 130 without being stored. Additionally, the image being captured (or recorded) by the camera unit 110 may correspond to a still image or a moving picture image. The camera unit 110 may also be used as a motion sensor or a video sensor. And, whenever required, the camera unit 110 may include diverse cameras.

Figure 2:
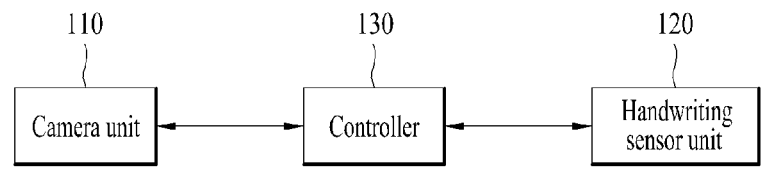
FIG. 2 illustrates a conceptual block view showing an electrical connection between elements included in the pen type multimedia device according to an exemplary embodiment of this specification.

FIG. 2 illustrates a conceptual block view showing an electrical connection between elements included in the pen type multimedia device according to an exemplary embodiment of this specification.

Referring to FIG. 2, the pen type multimedia device 10 may include a handwriting sensor unit 120 and a controller 130. Since the camera unit 110 has already been described above, detailed description of the same will be omitted for simplicity. Each of the camera unit 110 and the handwriting sensor unit 120 is electrically connected to the controller 130, so as to be capable of transmitting and receiving electrical signal to and from one another.

The handwriting sensor unit 120 may output input signals and handwriting signals by sensing the user's handwritten input (or handwriting input).

In this specification, an input signal refers to a user's input respective to how the image data, which are acquired by the camera unit 110, are to be processed. Examples of the input signal may correspond to an input for adding a text to the image data, an input for adding a tag to the image data, an input for storing (or saving) the image data in a specific folder, and an input for transmitting the image data to an external target.

The handwriting signal refers to content, such as a text that is to be inputted by using the pen type multimedia device 10 according to this specification. More specifically, when the user uses the device 10 just as a regular pen, the handwriting signal refers to a text, a number, a geometrical shape, an image, and so on, that is intended by the user.

The controller 130 may process the image data, which are captured (or taken) by the camera unit 110, and the user's input signal and handwriting signal, which are inputted through the handwriting sensor unit 120.

Figure 3:
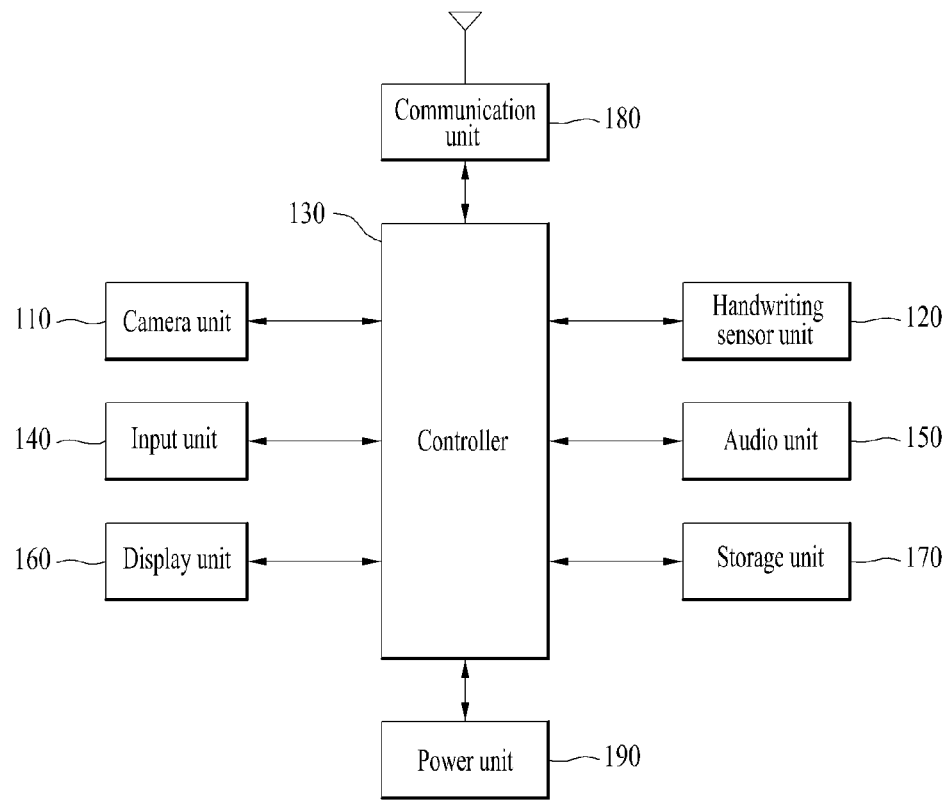
FIG. 3 illustrates a general block view showing elements that can be included in the pen type multimedia device according to an exemplary embodiment of this specification.

FIG. 3 illustrates a general block view showing elements that can be included in the pen type multimedia device according to an exemplary embodiment of this specification.

Referring to FIG. 3, the pen type multimedia device 10 may include an input unit 140, an audio unit 150, a display unit 160, a storage unit 170, a communication unit 180, and a power unit 190, in addition to the camera unit 110, the handwriting sensor unit 120, and the controller 130.

The input unit 140 may receive a user command from an external source. The input unit 140 may be implemented by using diverse methods. For example, the input unit 140 may be implemented as a keyboard, a keypad, a mouse, a touchpad, a button, a soft key, and so on. In a broader meaning, the input unit 140 may include a microphone, a touchscreen, and so on. The microphone may receive a voice of the user, and the touchscreen may receive a touch gesture of the user. In some cases, the microphone may be included in the audio unit 150, and the touchscreen may be included in the display unit 160.

The audio unit 150 may include an audio outputting means, such as speakers, and so on, and an audio inputting means, such as a microphone, and so on. The outputting means may output an audio signal of a content that is being executed in the device 10. The content may be provided by the storage unit 170 or may be provided from an external device through the communication unit 180. The outputting means may include at least one of an air conduction speaker and a bone conduction speaker.

The display unit 160 may output an image on a display screen. The display unit 160 may output an image based upon content being executed by the controller 130 or based upon a control command of the controller 130. More specifically, the controller 130 may display the image data recorded by the camera unit 110 on the display unit 160.

Figure 4:
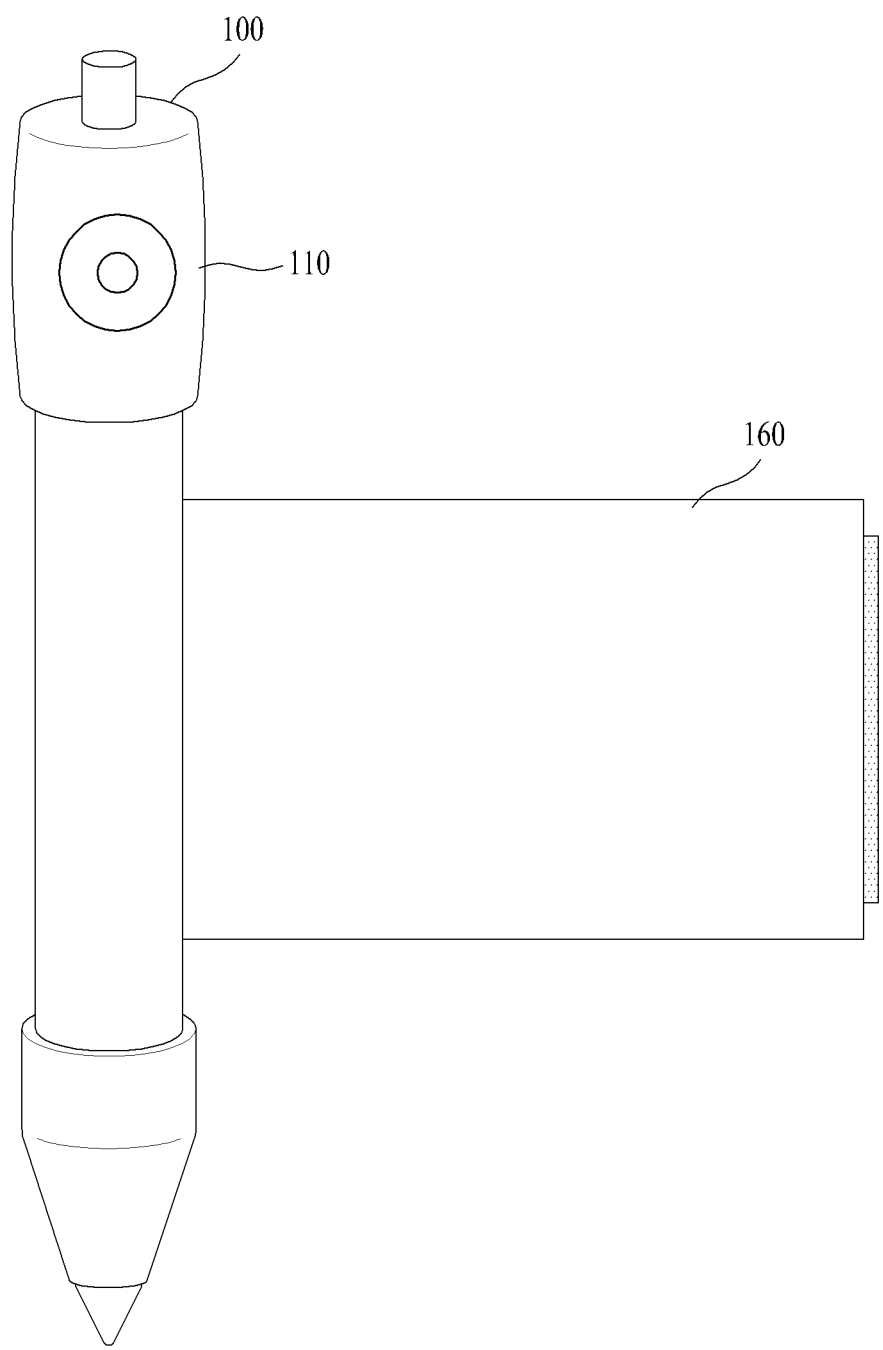
FIG. 4 illustrates an exemplary pen type multimedia device including a rollable display according to an exemplary embodiment of this specification.

According to an exemplary embodiment of this specification, the display unit 160 corresponds to a rollable display. FIG. 4 illustrates an exemplary pen type multimedia device including a rollable display according to an exemplary embodiment of this specification. Referring to FIG. 4, a pen type multimedia device 10 including a rollable display 160 according to an exemplary embodiment of this specification may be verified. For this, the body unit 100 may have a groove corresponding to a size of the rollable display 160 formed on one side surface. Additionally, the rollable display 160 may be in a rolled state inside the body unit 100 and, then, the rollable display 160 may be unrolled outside of the body unit 100 through the groove.

The storage unit 170 may store diverse types of digital device, such as video data, audio data, pictures, applications, and so on. An application may correspond to a program for performing operations of the controller 130. Additionally, the video or picture may correspond to data being acquired by the camera unit 110. The storage unit 170 may be implemented in diverse forms, such as a Random Access Memory (RAM), a Static Random Access Memory (SRAM), a Read Only Memory (ROM), an Electrically Erasable Programmable Read Only Memory (EEPROM), a Programmable Read Only Memory (PROM), and so on. Additionally, the storage unit 170 may also be operated in association with a web storage over the Internet, thereby being capable of performing a storage function. Additionally, the storage unit 170 may further include an external storage medium, which is detachably fixed to the device 10. The external storage medium may consist of a slot type, such as a Secure Digital (SD) memory or a Compact Flash (CF) memory, a memory stick type, a Universal Serial Bus (USB) type, and so on. More specifically, the external storage medium may be detachably fixed to the terminal device, and any storage medium that can diverse types of content, such as audio content, pictures, moving picture images, applications, and so on, to the device 10 may be used as the external storage medium. For example, the storage unit 170 may include a RAM, a ROM, a cache memory, a hard disk drive (HDD), a solid state drive (SSD), a compact disk (CD), a digital versatile disk (DVD), a Bluray disk, a floppy disk drive (FDD), a magnetic disk, a memory card, a flash memory, a USB memory, and so on.

The communication unit 180 may perform communication with an external device and transport and receive (or transceiver) data to and from the external device by using diverse protocols. The external digital device may either correspond to a mobile terminal (or user equipment) or may correspond to a fixed terminal (or user equipment). For example, the mobile terminal may correspond to a mobile phone, a smart phone, a tablet Personal Computer (PC), a smart pad, a notebook, a digital broadcasting terminal (or user equipment), a Personal Digital Assistant (PDA), a Portable Multimedia Player (PMP), a digital camera, a navigation system (or navigator), and so on, and the fixed terminal may correspond to a desktop, a Digital Video Disc (or Digital Versatile Disc) (DVD) player, a TV, and so on. The diverse protocols may correspond to wired or wireless communication protocols. In case of wired communication, the communication unit 180 may include diverse input/output interfaces (not shown), which are each configured to establish wired data transmission communication with the external digital device. For example, the interface may include a Universal Serial Bus (USB), a High Definition Multimedia Interface (HDMI), a Digital Visual Interface (DVI), IEEE 1349 standard types, or an interface based upon data transmission according to another similar standard, which is associated with data transmission. In case of wireless communication, the communication unit 180 may include an electric circuit network (or electrical network), which is based upon a wireless connection (or wireless access) to an external communication network, such as the Internet, Local Area Network (LAN), Wide Area Network (WAN), and so on. The wireless network that is accessed by the communication unit 180 may be supported with Global System for Mobile Communications (GSM), an Enhanced Data GSM Environment (EDGE), Code Division Multiple Access (CDMA), Wideband Code Division Multiple Access (W-CDMA), Time Division Multiple Access (TDMA), Wibro, and, may also be supported with an interface for a mobile communication method, such as High Speed Packet Access (HSPA), High Speed Downlink Packet Access (HS-DPA), Long Term Evolution (LTE), and so on, or an interface for a close-range communication method, such as Bluetooth, Radio Frequency Identification (RFID), Infrared Data Association (IrDA), Ultra Wideband (UWB), ZigBee, Wireless LAN (WLAN) (or Wi-Fi), and so on. Herein, the wired and/or wireless interface methods merely correspond to exemplary embodiments that are provided in order to facilitate the understanding of this specification. And, since the interface method for transmitting and/or receiving information may be easily changed by anyone skilled in the art, the interface method presented in this specification will not be limited only to the above-described exemplary embodiments.

As a power source being connected to a battery or an external power, the power unit 190 may supply power to the terminal device. The battery includes a primary battery as well as a secondary battery. Herein, the secondary battery may be configured of a rechargeable lithium ion battery, lithium polymer battery, nickel cadmium battery, nickel metal hydrogen battery, nickel iron battery, and so on.

Meanwhile, when the controller 130 according to this specification first acquires image data by using the camera unit 110, and, then, when the controller receives the user's input signal through the handwriting sensor unit 120 within a predetermined period of input time, the corresponding image data may be processed in accordance with a control operation respective to the input signal and handwriting input. The operations of the controller 130 will be described later on in more detail through the examples shown in FIG. 5 and FIG. 10.

Figure 5:
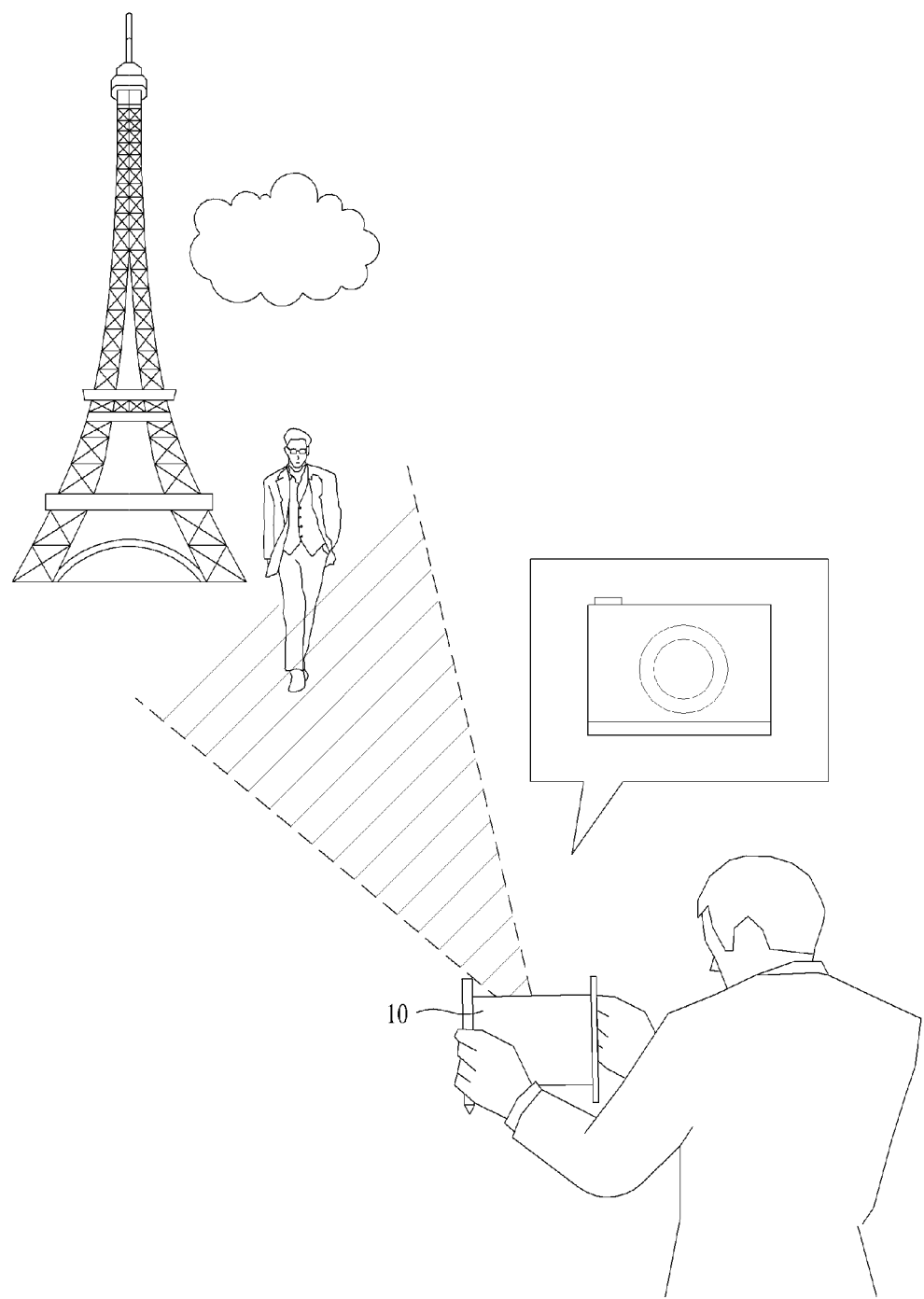
FIG. 5 illustrates an exemplary usage of the pen type multimedia device according to this specification.

FIG. 5 illustrates an exemplary usage of the pen type multimedia device according to this specification.

Referring to FIG. 5, it may be verified that the user can take a photo (or picture) by using the pen type multimedia device 10 according to this specification. At this point, the camera unit 110 may output the image data to the controller 130, and the controller 130 may output the image data to the display unit 160.

Figure 6:
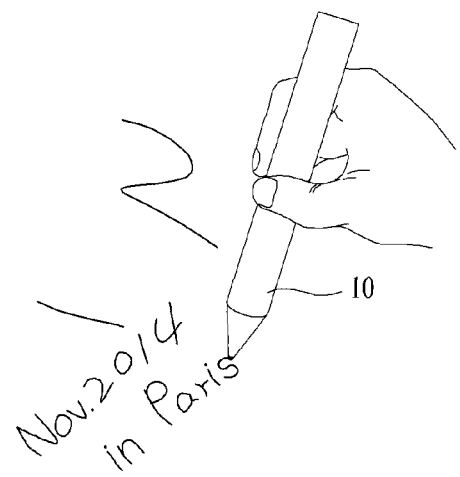
FIG. 6 illustrates an exemplary input for adding a text to image data according to an exemplary embodiment of this specification.

FIG. 6 illustrates an exemplary input for adding a text to image data according to an exemplary embodiment of this specification.

Referring to FIG. 6, it may be verified that the user is performing handwriting by using the pen type multimedia device 10 according to this specification According to the exemplary embodiment of this specification, when the input signal corresponds to a text input, the controller 130 may convert the input, which is received through the handwriting sensor unit 120, to a text and may add the converted text to the image data.

Figure 7:
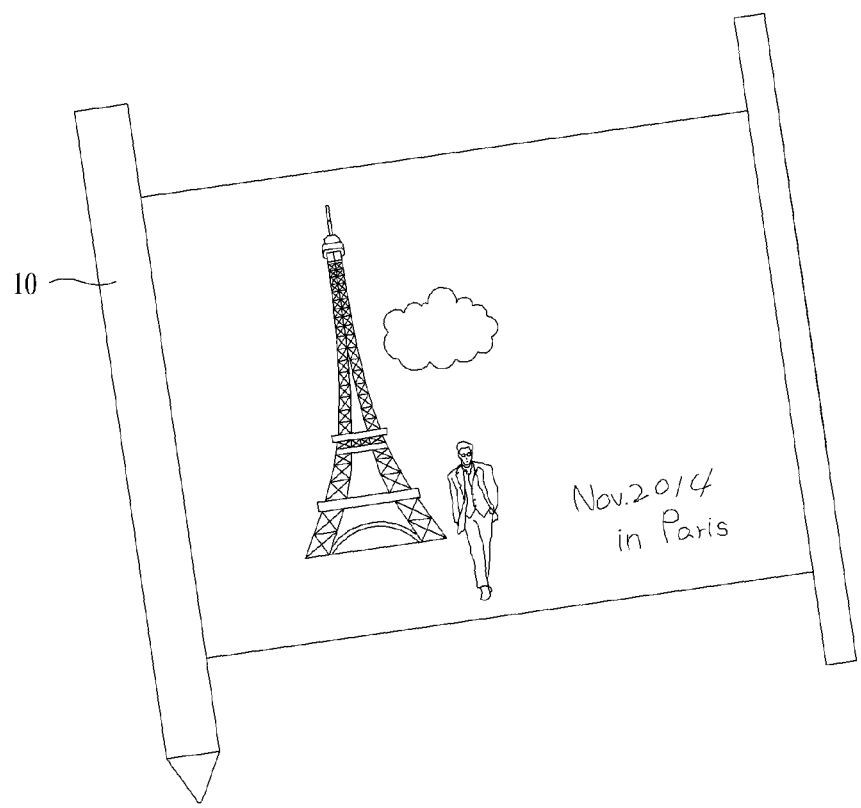
FIG. 7 illustrates an example of image data having a text added thereto according to an exemplary embodiment of this specification.

FIG. 7 illustrates an example of image data having a text added thereto according to an exemplary embodiment of this specification.

Referring to FIG. 7, it may be verified that the content of the handwriting input, which is inputted by the user, is converted to a text and then added to the image. According to an exemplary embodiment, as shown in the example of FIG. 7, when image data are displayed on the screen, the controller 130 may add the converted text to the image data, so that the converted text can be shown to overlay on the displayed photo (or image). According to another exemplary embodiment, when image data are displayed on the screen, the controller 130 may also add the converted text to a back side of the displayed photo (or image).

Figure 8:
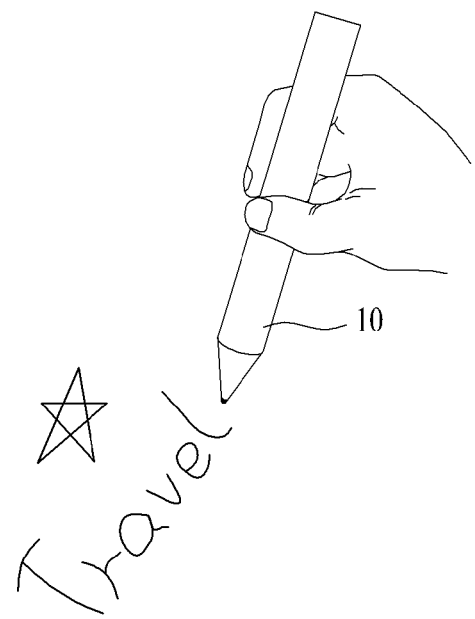
FIG. 8 illustrates an exemplary input for adding a tag to image data according to another exemplary embodiment of this specification.

FIG. 8 illustrates an exemplary input for adding a tag to image data according to another exemplary embodiment of this specification.

According to another exemplary embodiment of this specification, when the input signal corresponds to a tag input, the controller 130 may convert the input, which is received through the handwriting sensor unit 120, to a text and may add a tag respective to the converted text to the image data.

Figure 9:
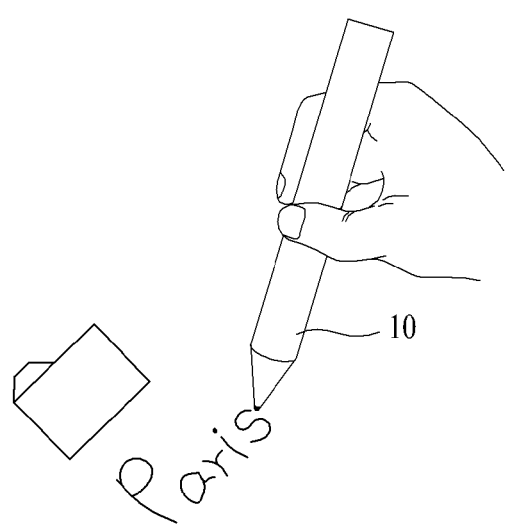
FIG. 9 illustrates an exemplary input for storing image data in a specific folder according to another exemplary embodiment of this specification.

FIG. 9 illustrates an exemplary input for storing image data in a specific folder according to another exemplary embodiment of this specification.

According to yet another exemplary embodiment of this specification, when the input signal corresponds to a storage folder selection input, the controller 130 may convert the input, which is received through the handwriting sensor unit 120, to a text and may store (or save) the image data to a folder respective to the converted text.

If a folder respective to the converted text does not exist, the controller 130 may first create a folder having a name of the converted text, and, then, the controller 130 may store the image data in the newly created folder.

Figure 10:
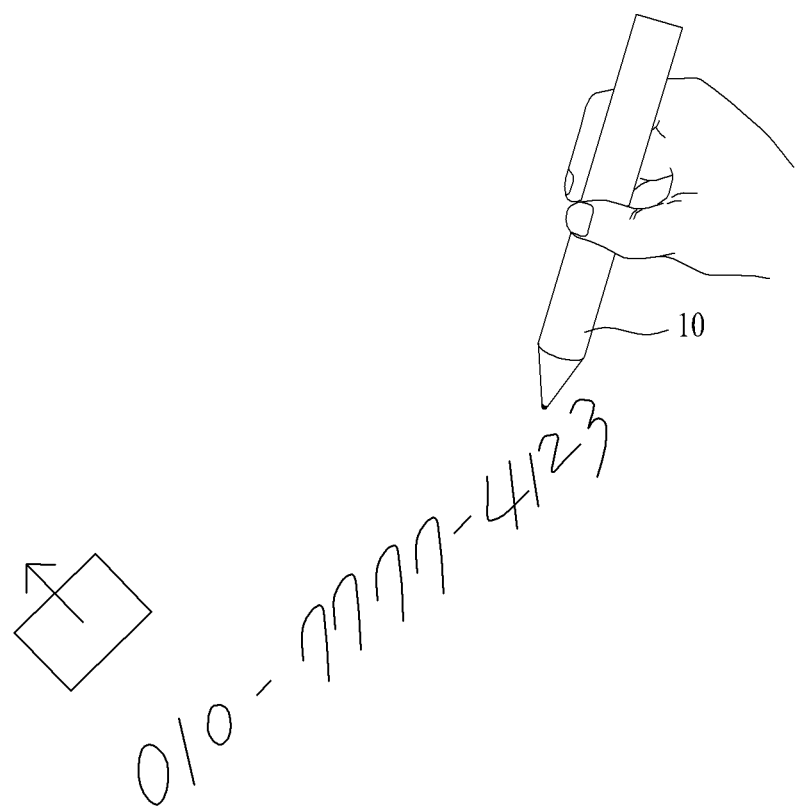
FIG. 10 illustrates an exemplary input for transmitting image data according to another exemplary embodiment of this specification.

FIG. 10 illustrates an exemplary input for transmitting image data according to another exemplary embodiment of this specification.

According to yet another exemplary embodiment of this specification, when the input signal corresponds to a data transmission input, the controller 130 may convert the input, which is received through the handwriting sensor unit 120, to a text and may transmit the image data to a destination (or recipient) respective to the converted text. In this case, the data transmission may include at least any one of a group consisting of SMS, e-mail, and SNS.

In FIG. 8 to FIG. 10, it may be verified that a geometrical shape is further illustrated in the drawing apart from the text in order to differentiate the input signal. According to this specification, in order to select an input he (or she) wishes, the user may draw (or illustrate) a predetermined specific text or geometrical shape, so that the device 10 according to this specification can receive the respective data processing method.

According to an exemplary embodiment of this specification, the handwriting sensor unit 120 corresponds to an acceleration sensor. Additionally, the controller 130 may convert a pattern, which is received through the handwriting sensor unit 120, to a text, and the controller 130 may then process the image data in accordance with the control operation respective to the converted text. According to this exemplary embodiment, the user is not required to perform handwriting (or take down notes) only on actual paper, and, therefore, the user may also input his (or her) handwriting by performing handwriting motions in the air.

According to another exemplary embodiment of this specification, the pen type multimedia device 10 further includes a handwriting unit 121, which is positioned on one end of the body unit. Additionally, the handwriting sensor unit 120 may correspond to an image recognition sensor, which is configured to recognize text that is written by handwriting unit 121. And, the controller 130 may convert the characters, which are recognized by the handwriting sensor unit 120, to a text via optical character recognition (OCR), and the controller 130 may then process the image data in accordance with the control operations respective to the converted text. According to this specification, since the device 10 can recognize handwriting written on paper, and so on, accuracy in the user input may be enhanced.

The controller 130 may execute contents that are stored in the storage unit 170, contents that are received via data communication, and so on. Additionally, the controller 130 may execute diverse applications and may perform processing on data stored in the digital device 10. Additionally, the controller 130 may control each of the above-described elements of the digital device 10, and the controller 130 may also control data transmission and/or reception (or data transception) between each of the elements. The controller 130 may include a processor, an application-specific integrated circuit (ASIC), another chip set, a logical circuit, a register, a communication modem, a data processing device, and so on, that are well-known to the related field of technology for executing diverse control logics, which will hereinafter be described in detail. Moreover, in case the above-described control logic is implemented as software, the controller 130 may be implemented as a collection (or group) of program modules. At this point, a program module may be stored in the storage unit 170 and may be executed by a processor.

Hereinafter, a method for controlling a pen type multimedia device according to this specification will be described in detail. However, since each element of the pen type multimedia device 10 has already been described above, detailed description of the same will be omitted for simplicity.

FIG. 11 illustrates a flow chart of a method for controlling a pen type multimedia device according to an exemplary embodiment of this specification.

First of all, in step S200, the controller 130 acquires image data by using the camera unit 110. And, the controller 130 carries out step S210.

In the following step S210, after acquiring the image data, the controller 130 determines whether or not the user's input signal is received through the handwriting sensor unit 120 within a predetermined period of input time. In case the input signal is inputted within the predetermined period of time ('Yes' of step S210), the controller 130 carries out step S220.

In the following step S220, the controller 130 processes the image data in accordance with the control operation respective to the input signal. And, then, the controller 130 ends the process.

According to an exemplary embodiment of this specification, when the input signal corresponds to a text (or character) input, in step S220, the controller 130 may convert the input, which is received through the handwriting sensor unit 120 to a text, and, then, the controller 130 may add the converted text to the image data. This exemplary embodiment has already been described above in detail with reference to FIG. 5 to FIG. 7.

According to another exemplary embodiment of this specification, in step S220, when the input signal corresponds to a tag input, the controller 130 may convert the input, which is received through the handwriting sensor unit 120 to a text, and, then, the controller 130 may add a tag respective to the converted text to the image data. This exemplary embodiment has already been described above in detail with reference to FIG. 8.

According to yet another exemplary embodiment of this specification, in step S220, when the input signal corresponds to a tag input, the controller 130 may convert the input, which is received through the handwriting sensor unit 120 to a text, and, then, the controller 130 may add a tag respective to the converted text to the image data.

According to yet another exemplary embodiment of this specification, in step S220, when the input signal corresponds to a storage folder selection input, the controller 130 may convert the input, which is received through the handwriting sensor unit 120 to a text, and, then, the controller 130 may store (or save) the image data to a folder respective to the converted text.

According to a further exemplary embodiment of this specification, in step S220, when the input signal corresponds to a data transmission input, the controller 130 may convert the input, which is received through the handwriting sensor unit 120 to a text, and, then, the controller 130 may transmit the image data to a destination (or recipient) respective to the converted text.

As described above, the pen type multimedia device for processing image data by using handwriting input and the method for controlling the same have the following advantages. According to this specification, users who are more accustomed to the usage of the conventional pen may be capable of processing image data by using handwriting input.

In addition, although the terms used in this specification are selected from generally known and used terms, the terms used herein may be varied or modified in accordance with the intentions or practice of anyone skilled in the art, or along with the advent of a new technology. Alternatively, in some particular cases, some of the terms mentioned in the description of this specification may be selected by the applicant at his or her discretion, the detailed meanings of which are described in relevant parts of the description herein. Furthermore, it is required that this specification is understood, not simply by the actual terms used but by the meaning of each term lying within.

Additionally, specific structural and functional description of this specification respective to the exemplary embodiments, which are provided in accordance with the concept of this specification disclosed in the description of this specification, is merely an exemplary description provided for the purpose of describing the exemplary embodiments according to the concept of this specification. And, therefore, the exemplary embodiment of this specification may be realized in diverse forms and structures, and, it should be understood that this specification is not to be interpreted as being limited only to the exemplary embodiments of this specification, which are described herein.

Since diverse variations and modifications may be applied to the exemplary embodiments according to the concept of this specification, and, since the exemplary embodiments of this specification may be configured in diverse forms, specific embodiment of this specification will hereinafter be described in detail with reference to the examples presented in the accompanying drawings. However, it should be understood that the exemplary embodiments respective to the concept of this specification will not be limited only to the specific structures disclosed herein. And, therefore, it should be understood that all variations and modifications, equivalents, and replacements, which are included in the technical scope and spirit of this specification, are included.

Furthermore, when a part is said to "include" an element, it is to be understood that, unless obviously and clearly noted or specified otherwise within the specification, other elements may be further included instead of excluding the other elements. And, the terms, such as "unit", and so on, that are mentioned in the elements used in this specification are merely used individually or in combination for the purpose of simplifying the description of this specification, and this may be realized by the combination of hardware and/or software.

This specification has been presented as described above according to the detailed and exemplary embodiments, and, therefore, it should be understood that all variations and modifications, equivalents, and replacements, which are included in the technical scope and spirit of this specification, can be made by anyone skilled in the art. Therefore, it should also be understood that the scope and spirit of this specification includes details that can be easily deduced and estimated by anyone skilled in the art based upon the detailed description and exemplary embodiments set forth herein.

Additionally, although this specification has been described in detail based upon an example of having only one subsidiary element added for simplicity, embodiments having two or more subsidiary elements further added to the display device may also be realized. Therefore, the exemplary disclosed herein will not limit the scope of this specification.

What is claimed is:

1. A pen type multimedia device, comprising:
a body configured to have a pen form, wherein the body comprises a rollable display and a groove formed on one side of the body, a size of the groove corresponds to a size of the rollable display, and wherein the rollable display is configured to be unrolled outside of the body through the groove after being rolled inside the body;
at least one or more cameras each configured to record a surrounding area of the body;
an accelerometer sensor configured to sense a pattern of movement of the pen type multimedia device; and
a controller configured to:
acquire an image using the one or more cameras;
convert the pattern sensed by the accelerometer sensor to a handwriting using the accelerometer sensor within an input time, wherein the input time is a predetermined time from a time the image is acquired;
display the image on the rollable display;
when the handwriting comprises a text, add the text to the image displayed on the rollable display; and
when the handwriting comprises a geometrical shape and a text, perform a specific function within the pen type multimedia device corresponding to the handwriting for processing the image.

2. The pen type multimedia device of claim 1, wherein, when the handwriting comprising the text and the image is displayed on a screen, the text is displayed as overlaying on the displayed image.

3. The pen type multimedia device of claim 1, wherein, when the handwriting comprising the text and the image is displayed on a screen, the text is added to a back side of the displayed image.

4. The pen type multimedia device of claim 1, wherein, when the handwriting comprises a geometrical shape corresponding to a tag input and the text, the controller is further configured to add a tag to the image by using the text.

5. The pen type multimedia device of claim 1, wherein, when the handwriting comprises a geometric shape corresponding to a storage folder selection input and the text, the controller is further configured to store the image to a folder corresponding to the text.

6. The pen type multimedia device of claim 5, wherein, when the folder corresponding to the text does not exist, the controller is further configured to create a folder having a name of the text, and store the image in the newly created folder.

7. The pen type multimedia device of claim 1, wherein, when the handwriting comprises a geometrical shape corresponding to a data transmission input and the text, the controller is further configured to transmit the image to a destination corresponding to the text.

8. The pen type multimedia device of claim 7, wherein the data transmission is performed by using at least any one of SMS, e-mail, or SNS.

9. A method for controlling a pen type multimedia device, the method comprises:
providing the pen type multimedia device, the pen type multimedia device comprising a body having a rollable display and a groove formed on one side of the body, a size of the groove corresponds to a size of the rollable display;
acquiring an image via a camera of the pen type multimedia device;
sensing a pattern of movement of the pen type multimedia device via an accelerometer sensor of the pen type multimedia device;
converting the pattern sensed through the accelerometer sensor to a handwriting using the sensor within an input time, wherein the input time is a predetermined time from a time the image is acquired;
displaying the image on the rollable display;
when the handwriting comprises a text, adding the text to the image displayed on the rollable display; and
when the handwriting comprises a geometric shape and a text, performing a specific function within the pen type multimedia device corresponding to the handwriting for processing the image.

10. The method of claim 9, wherein, when the handwriting comprises a geometrical shape corresponding to a tag input and the text, the specific function is adding a tag to the image by using the text.

11. The method of claim 9, wherein, when the handwriting comprises a geometrical shape corresponding to a storage folder selection input and the text, the specific function is storing the image to a folder corresponding to the text.

12. The method of claim 9, wherein, when the handwriting comprises a geometrical shape corresponding to a data transmission input and the text, the specific function is transmitting the image to a destination corresponding to the text.

* * * * *